Jan. 26, 1960 L. U. SEARFOSS 2,922,585
TREATING USED SUBMERGED ARC WELDING FLUX
Filed Jan. 24, 1956 2 Sheets-Sheet 2
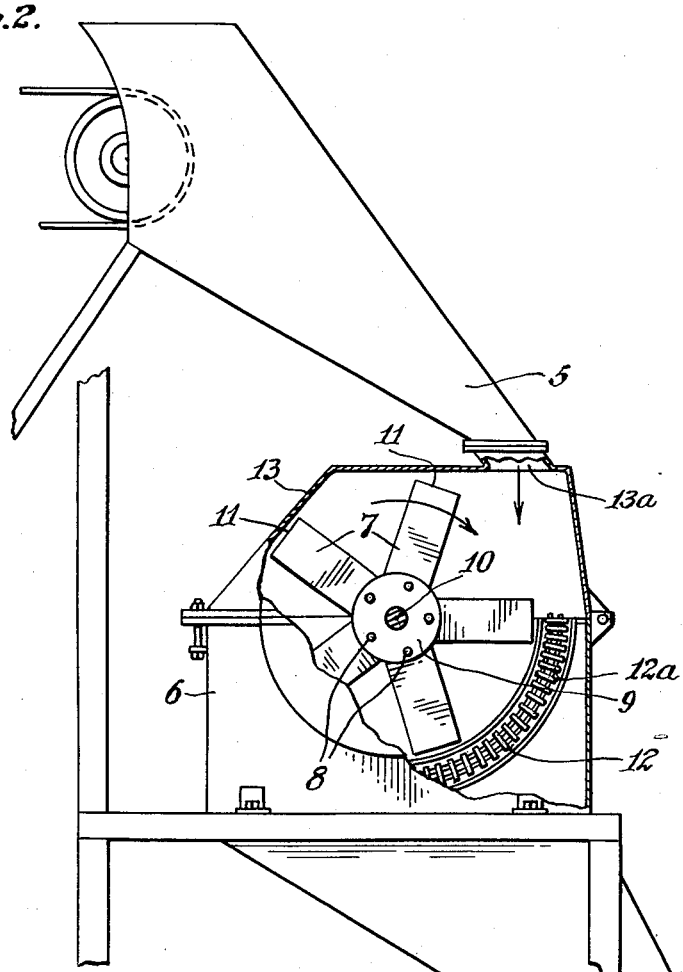
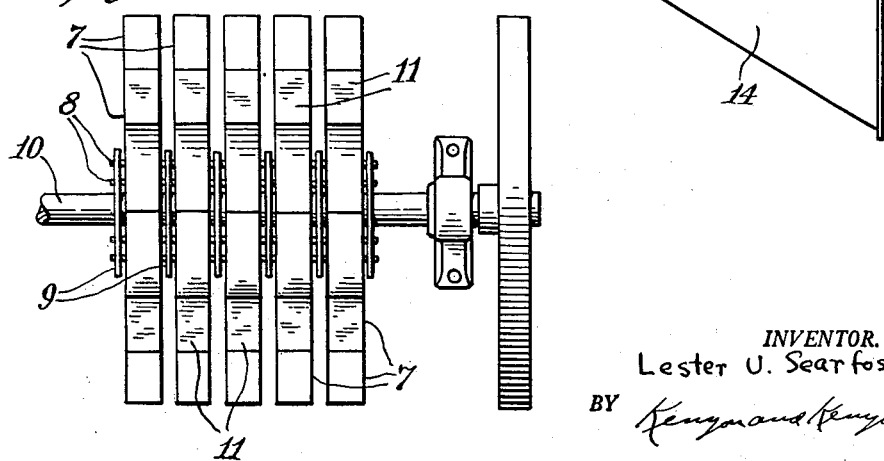
INVENTOR.
Lester U. Searfoss
BY
ATTORNEYS.

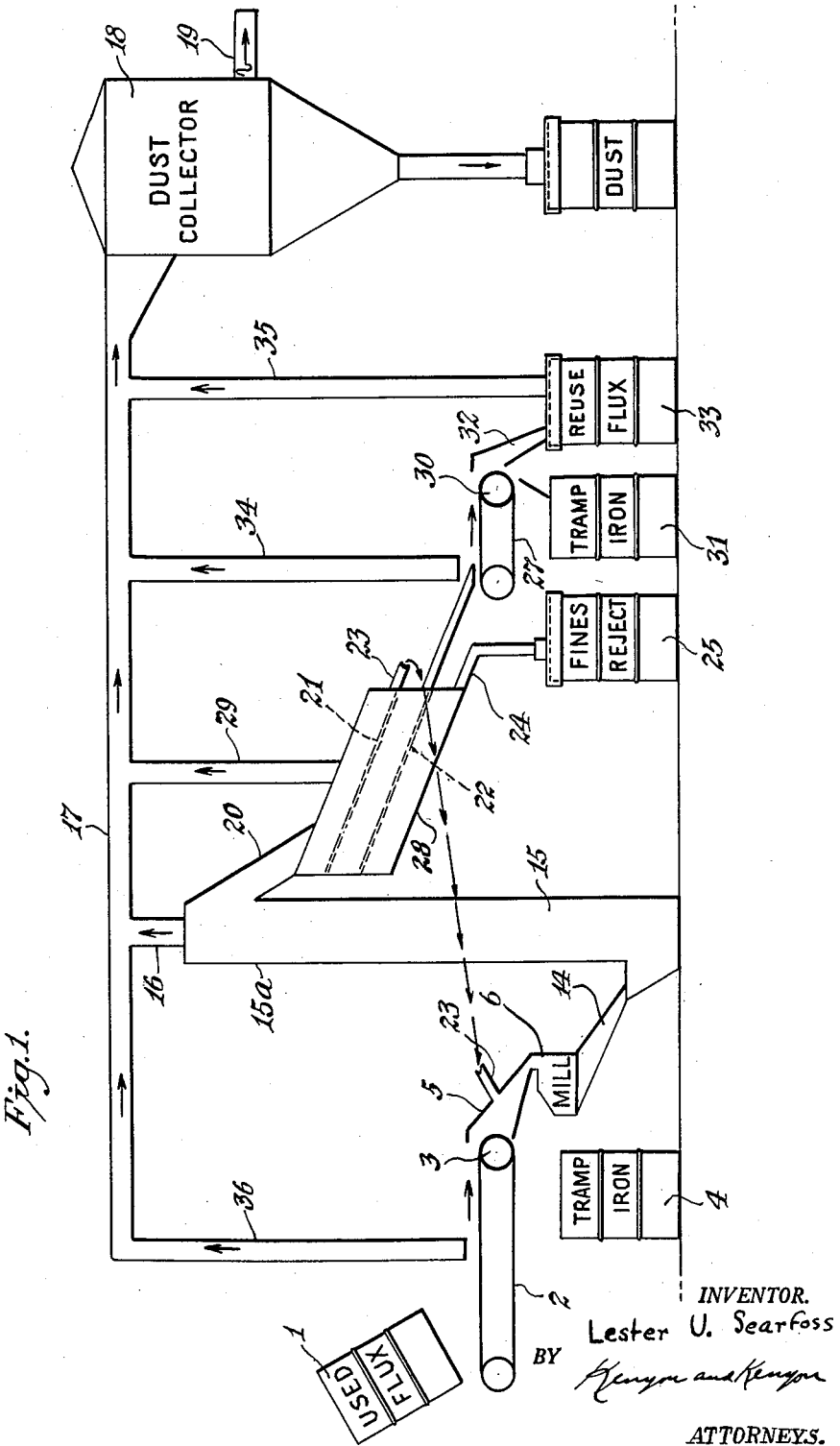

United States Patent Office 2,922,585
Patented Jan. 26, 1960

2,922,585

TREATING USED SUBMERGED ARC WELDING FLUX

Lester U. Searfoss, South Chicago Heights, Ill.

Application January 24, 1956, Serial No. 561,101

2 Claims. (Cl. 241—14)

This invention relates to the treatment of used submerged arc welding flux for the purpose of rendering the flux suitable for reuse.

In the submerged arc welding process the welding wire or rod is deposited on the welding zone of the work by means of an arc which is kept submerged in a mass of flux. This flux has a principal base either silica or clay. This flux is produced today by various manufacturers and its general compositions and characteristics are well known. Because the flux must be used in sufficient quantities to submerge the arc it must be used in relatively large quantities during submerged arc welding operations. This means that the cost of the flux represents a substantial portion of the overall welding costs.

During the welding operation the heat of the arc fuses the flux which then remains on the weld in the form of scabs which are of a vitreous nature. After welding these scabs are removed by chipping. Also, the welding arc sputters to some degree so as to throw about a splatter in the form of globules of molten flux which deform when they ultimately land on a supporting surface.

The very nature of the submerged arc welding process demands that the flux be in the form of relatively small particles of substantially uniform size which may be piled along the weld zone so as to bury and space an electrode therefrom or flowed continuously over the welding arc. Obviously the scabs and splatter are useless for this purpose. At the same time the scabs and splatter are unchanged chemically.

In addition to being useless because of their physical form the scabs and splatter contain entrained metallic particles representing molten welding metal mixed with the fused flux. When the flux solidifies this metal naturally is embedded in the vitreous forms.

At first glance it would seem to be simple to grind up the collected scabs and splatter so as to reduce this material to a particle size suitable for reuse. The economic attractiveness of this idea has led to a number of attempts along these lines, all of which have been abandoned insofar as is known. In several instances these attempts have been made by prominent manufacturers who spent considerable sums of money to no avail. Factually, the skills of the art have been inadequate to cope with this problem.

With the foregoing in mind, one of the objects in the present instance is to invent a process and apparatus which will permit the treatment of the described used flux so as to render it entirely suitable for reuse.

Possibly the main thing that caused the prior art failures was the inability under commercial operating conditions to obtain a high enough recovery of usable flux to warrant the necessary capital investment and operational costs necessarily involved. Therefore, a very important object here is to overcome this obstacle or, in other words, to effect a very substantial recovery of usable flux in proportion to the used flux treated. This, of course, means that the equipment costs must not be multiplied by fancy apparatus of very unusual design or by processing procedures with which ordinary workmen cannot become readily acquainted.

For the purpose of disclosing the present invention the following description, taken with the accompanying drawings, discloses a specific example of an apparatus and process suitable for use in the case of the described kind of used flux resulting from the welding of ferrous products.

In these accompanying drawings, Fig. 1 schematically shows the complete apparatus while Fig. 2 is a vertical cross section through an important element, Fig. 3 being an elevation of a detail in Fig. 2.

In Fig. 1 the inverted drum 1 represents a feed of the used flux. Due to the manner in which submerged arc welding operations are conducted, unused welding flux may be spilled on the floor, and the scabs and splatter frequently reach the floor during the chipping or directly during the welding. All of this material is swept up and saved for reprocessing, and it often contains wood and paper litter which was on the floor. Except when treated by the present invention all of this material is ordinarily discarded as waste. It is to be assumed that this is the kind of material that the present treatment starts with.

Such waste material is gradually fed on a horizontal belt conveyor 2 so that it feeds over this conveyor in a more or less even layer. This is to expose the litter contained by the material and permit the removal of this litter by any suitable means. In actual practice a workman with a vacuum hose removes the wood, paper and other similar materials. Therefore, when the layer of materials reaches the end of the conveyor 2 it consists substantially entirely of scabs and splatter, particles of the ferrous welding metal and all of the unused welding flux which the workman did not unavoidably pick up while collecting the litter.

The above described step may be carried out in any fashion permitting the removal from the waste welding flux of all litter and trash and, of course, while removing as little of the welding flux itself as is possible.

At the end of the conveyor 2 the belt drum 3 is of the magnetic separator type so that all loose iron particles are carried around the drum and dropped into a receptacle 4. This represents the metallic particles which are loose, commonly referred to as tramp iron, and the removal of these loose metallic particles at this time is important. Flux which contains metallic particles, which particles are quite small as compared to tramp iron, ordinarily will pass over the drum 3 into the mill 6. The metallic particles, at this stage still embedded therein, are removed by other magnetic apparatus at a later stage in the process.

The litter-free and tramp iron free scabs and splatter, and any unused waste flux, discharge from the end of the conveyor 2 through a chute 5 to a hammer mill 6 of special design.

At this point it is appropriate to comment that the prior art failures have been found to be due to the manner in which the scabs and splatter were disintegrated in attempts to reduce them to a proper particle size. Excessive grinding action produced unusable powder, dust collected so as to contaminate the product and render it inferior as a welding flux, and efforts to use water during the disintegration attempts were ruinous to the product.

Referring to the hammer mill 6, this unit is termed a hammer mill because this is its ordinary commercial designation. However, the design of this special mill is such as to avoid grinding or abrasive action insofar as is possible, while still applying substantially pure or simple impact forces to the scabs and splatter to cause their granulation to the particle size desired. In other words, this unit functions to granulate the matter as contrasted to grinding or pulverizing effects, such effects being considered undesirable and being avoided.

Reference to Figs. 2 and 3 show that in this new mill design the hammers 7 have broad faces and are pivotally connected at 8 to disks 9 which are fixed to the shaft 10 which is rotated by a suitable power source. Furthermore, the outer ends 11 of these hammers are arranged to terminate in spaced relation to the inner face of the semi-cylindrical screen 12. The moving parts and the screen 12 are contained within a casing 13, the screen 12 dividing this casing into upper and lower parts and the lower part discharging through a chute 14. As seen in Fig. 2 the shaft 10 turns in a clockwise direction and the casing's inlet 13a is offset horizontally from the axis of the shaft 10 and in such a manner that the material falling through the inlet 13a drops on the hammers 11 only while they are moving downwardly. The location of the inlet 13a can be at different places but its location and the rotation of the hammers should always be correlated so that the scabs and splatter drop to the hammers only while the latter are moving downwardly in the direction which the scabs and splatter fall.

When in operation the shaft 10 is turned fast enough, in the proper direction, to cause the hammers 11 to move at peripheral speeds substantially faster than the speed with which the scabs and splatter gravitationally fall to the hammers. Thus the vitreous or glass-like particles are immediately subjected to impact when they enter the mill and then they are repeatedly picked up and thrown against the inside of the casing 13 and, of course, the screen 12. This screen 12 is formed by mounting a number of relatively heavy parallel bars 12a so that they are spaced from each other, like a grate, and extend semi-cylindrically around beneath the hammers but spaced from the ends of the latter. The free-swinging action of the hammers produces a rapid rolling of the material with sufficient space between the outside ends of the hammers and all other parts to prevent any splintering, grinding or pulverizing of the material insofar as this is possible. In actual practice the grate bars 12a of the screen 12 are spaced about 5/16 of an inch apart and as soon as the scabs and splatter are granulated to this size they pass through the screen 12 and discharge down the chute 14.

Because the tramp iron was removed previously it does not exert a powdering effect on the scabs and splatter while the latter are subjected to the impact forces provided by the action of the new mill. The material is subjected substantially only to these impact forces. This is shown by the fact that the present invention recovers from 75% to 95% of the scabs and splatter charged, in the form of granulated flux which may be used as effectively as new flux and sometimes the reprocessed flux of the present invention shows even superior results.

Discharging down the chute 14 the granulated flux falls to the bottom of what may be a conventional elevator 15 of the bucket-type. This comprises a series of buckets fastened to a vertical loop of one or more sprocket chains, the loop being suitably powered to rotate.

An unusual feature is that this bucket conveyor is incased by a casing 15a provided with an exhaust duct 16 which connects with a header 17 going to a dust collector 18 from which the air is drawn through an outlet 19. As the granulated material travels upwardly through the casing 15a it is subjected for substantial periods of time to a vacuum effect which draws off any dust created unavoidably during the granulating action. If this dust is not removed the use of the flux in connection with submerged arc welding tends to result in porous welds. Other means may be used to subject the granulated flux to a dust removal treatment and, in fact, in the present invention the material is in effect dusted or vacuum cleaned at all possible times.

At the top of the casing 15a the bucket conveyor discharges through a declining chute 20 which leads to two classifying or grading screens 21 and 22. The screen 21 separates oversized or insufficiently granulated material which may be discharged back to the chute 5 through a suitable conduit 23 of which only the inlet and outlet segments are shown in the drawings. The fines unavoidably produced fall through the screen 22 and are discharged through an outlet conduit 24 to a collector 25. The granulated flux which passes the screen 21 but does not pass the screen 22 is discharged through a conduit 26 to a magnetic material separating unit 27.

The screens 21 and 22 may follow prior art practices and preferably are agitated as in the conventional manner. However, the agitation must be gentle enough to avoid any abrasive or grinding action on the granulated material. The action must be gentle enough to avoid powdering, for example. The flux granules are glass-like in character and the useful yield of the process can be drastically reduced by over-enthusiastic agitation. The screens decline in the usual fashion and by making the angle of declination great enough the necessary flow over the screens can be obtained with the described gentle type of agitation. The screen declination should be sufficient to prevent the material from piling up and in this fashion exerting a grinding or powdering action on itself. The declination and agitation frequency and amplitude of the screens should be correlated so as to keep a uniform flow of material on the screens without causing the particles to violently impact with each other.

The screens 21 and 22 are enclosed by a casing 28 which connects by a duct 29 with the header 17, so here again the granulated flux is subjected to a dust removal or vacuum cleaning action. Due to the frangible nature of the flux it is continuously attempting to reduce itself to powder whenever it flows and dust removal at every opportunity is, therefore, of importance.

Practically all of the metal particles, in this case iron particles, embedded in the flux are loosened or separated during the described granulating step. These particles are quite small, as compared to tramp iron, and exert but little if any grinding or fragmenting action on the flux granules. However, these metallic particles must be removed before the flux is reused.

As shown the unit 27 is similar to that described at the entrance end of the apparatus, the magnetic roller 30 carrying the metallic particles around and dropping them into a receptacle 31, while a chute 32 discharges the granulated and now reusable flux into a container 33.

It is to be noted that a conduit 34 leads from the point of discharge of the chute 26 to the header 17 so as to subject the granules to a dust removal treatment at this point. Furthermore, even the finished product receptacle 33 is connected by a conduit 35 with the header 17 so that as the finished material discharges into this receptacle there can be no dust accumulation whatsoever to any substantial degree.

For convenience the suction source required for the initial cleaning of litter, may be provided by a conduit 36 which also connects with the header 17.

In the interests of a maximum yield or recovery, the various chutes described should be arranged to handle the material as gently as possible consistent with a rapid enough flow to meet commercial operating conditions. All of the equipment is commercially available excepting for the necessary reconstruction of the hammer mill required to make it work primarily by impact forces applied to the granules without grinding or abrasive action. This impact force should be applied by, in effect, throwing the material or striking the material while avoiding all abrading action insofar as is possible.

It is to be noted that this process and apparatus operates dry throughout. Dust is removed substantially as fast as it forms. By using suitable casings in conjunction with the exhaust system, healthful working conditions are maintained at the same time as the desirable dust removal steps are applied to the flux.

Since the hammers always swing downwardly and away from the inlet to the hammer mill, the scabs and splatter do not choke up the entrance, but are instead, in effect, sucked into the whirling mass smoothly. This action contributes greatly to the granulation by impact forces only and the avoidance of grinding or splintering action on the glass-like scabs and splatter.

I claim:

1. A process for treating, to permit its reuse, used submerged arc welding flux in the form of scabs and splatter, said process comprising treating said scabs and splatter to remove loose metal therefrom, applying impact force to the treated scabs and splatter while avoiding substantial grinding action thereon and thereby granulating a substantial majority thereof to a particle size suitable for reuse, sieving said granulated flux so as to separate insufficiently granulated particles and fines therefrom but gently so as to avoid substantial grinding action on the granulated flux, said granulating detaching embedded metal particles from said flux, and separating said loosened particles from said flux.

2. A dry process for treating, to permit its reuse, used submerged arc welding flux in the form of scabs and splatter, said process comprising treating said scabs and splatter to remove loose metal therefrom, applying impact force to the treated scabs and splatter while avoiding substantial grinding action thereon and thereby granulating a substantial majority thereof to a particle size suitable for reuse, sieving said granulated flux so as to separate insufficiently granulated particles and fines therefrom but gently so as to avoid substantial grinding action on the granulated flux, said granulating detaching embedded metal particles from said flux, and separating said loosened particles from said flux, and dust resulting from said granulating and sieving being removed from said flux prior to its reuse.

References Cited in the file of this patent

UNITED STATES PATENTS

| Number | Name | Date |
|---|---|---|
| Re. 13,382 | Edison | Mar. 12, 1912 |
| 816,735 | Penther | Apr. 3, 1906 |
| 1,286,831 | Sturtevant | Dec. 3, 1918 |
| 1,593,491 | Gerson | July 20, 1926 |
| 1,898,371 | Hutchins | Feb. 21, 1933 |
| 2,175,484 | Rees et al. | Oct. 10, 1939 |
| 2,177,358 | Atwood | Oct. 24, 1939 |
| 2,264,204 | Heckett | Nov. 25, 1941 |
| 2,360,892 | Rench et al. | Oct. 24, 1944 |
| 2,515,194 | Christensen | July 18, 1950 |
| 2,721,035 | Lankford et al. | Oct. 18, 1955 |